(12) United States Patent
Trui

(10) Patent No.: US 9,605,802 B2
(45) Date of Patent: Mar. 28, 2017

(54) MACHINE HOUSING WITH ROPE STOP SAFETY

(71) Applicant: Hänel GmbH & Co. KG, Bad Friedrichshall (DE)

(72) Inventor: Roger Trui, Bad Friedrichshall (DE)

(73) Assignee: Hänel GmbH & Co. KG, Bad Friedrichshall (DE)

( * ) Notice: Subject to any disclaimer, the term of this patent is extended or adjusted under 35 U.S.C. 154(b) by 0 days.

(21) Appl. No.: 14/809,873

(22) Filed: Jul. 27, 2015

(65) Prior Publication Data

US 2017/0030518 A1    Feb. 2, 2017

(51) Int. Cl.
| | | |
|---|---|---|
| *F16P 1/00* | (2006.01) | |
| *F16P 1/02* | (2006.01) | |
| *B23Q 11/08* | (2006.01) | |

(52) U.S. Cl.
CPC ............ *F16P 1/02* (2013.01); *B23Q 11/0891* (2013.01)

(58) Field of Classification Search
CPC ........ F16P 1/02; B23C 11/0891; A47B 47/00; A47B 47/0066; A47B 47/0075; A47B 47/025; A47B 47/042; A47B 81/00; A47B 96/025
USPC ...................... 312/271, 272, 272.5
See application file for complete search history.

(56) References Cited

U.S. PATENT DOCUMENTS

| | | | | |
|---|---|---|---|---|
| 5,299,806 A | * | 4/1994 | Fifer, Jr. ................ | G09B 23/02 273/159 |
| 5,632,701 A | * | 5/1997 | Neel ...................... | B65G 17/08 24/33 B |
| 2008/0011920 A1 | * | 1/2008 | Sloan ................... | A47B 43/003 248/235 |
| 2008/0036342 A1 | * | 2/2008 | Heyer ................... | A47B 47/00 312/257.1 |
| 2010/0288450 A1 | * | 11/2010 | Bruck ................... | F16M 11/38 160/238 |
| 2011/0062301 A1 | * | 3/2011 | Sloan ................... | A47B 43/003 248/304 |
| 2014/0167581 A1 | * | 6/2014 | Africa ................. | A47B 96/025 312/257.1 |
| 2016/0138627 A1 | * | 5/2016 | Bellido ............. | A47B 47/0066 428/100 |

* cited by examiner

*Primary Examiner* — Daniel Rohrhoff
(74) *Attorney, Agent, or Firm* — Ware, Fressola, Maguire & Barber LLP

(57) ABSTRACT

A machine housing of a machine tool or an automated machine such as an automated storage system having protective side walls covering the lateral sides of the machine housing, wherein each lateral side wall comprises at least one or a plurality of wall segments, arranged on top of each other, wherein a rope stop safety is provided, wherein each wall segment is secured to the machine housing via said rope stop safety and wherein said rope stop safety comprises at least one cable.

17 Claims, 5 Drawing Sheets

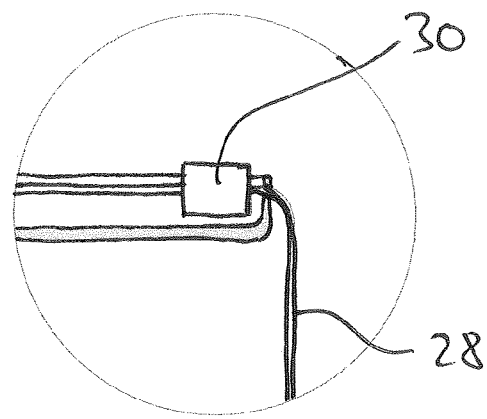
fig.3a
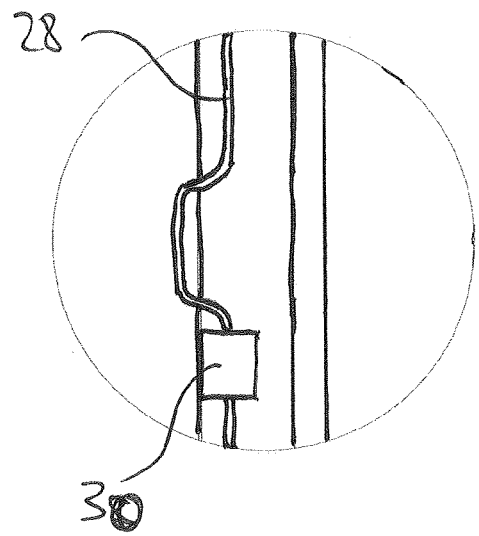
fig.3b
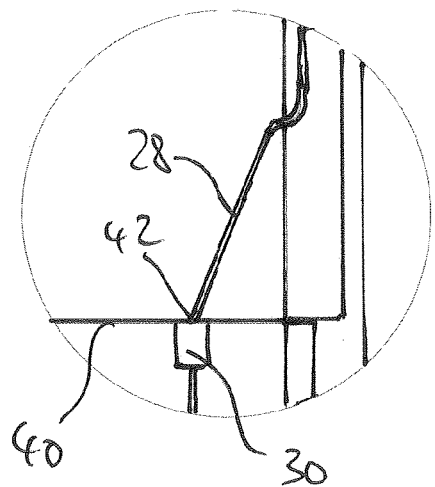
fig.3c
Fig.3

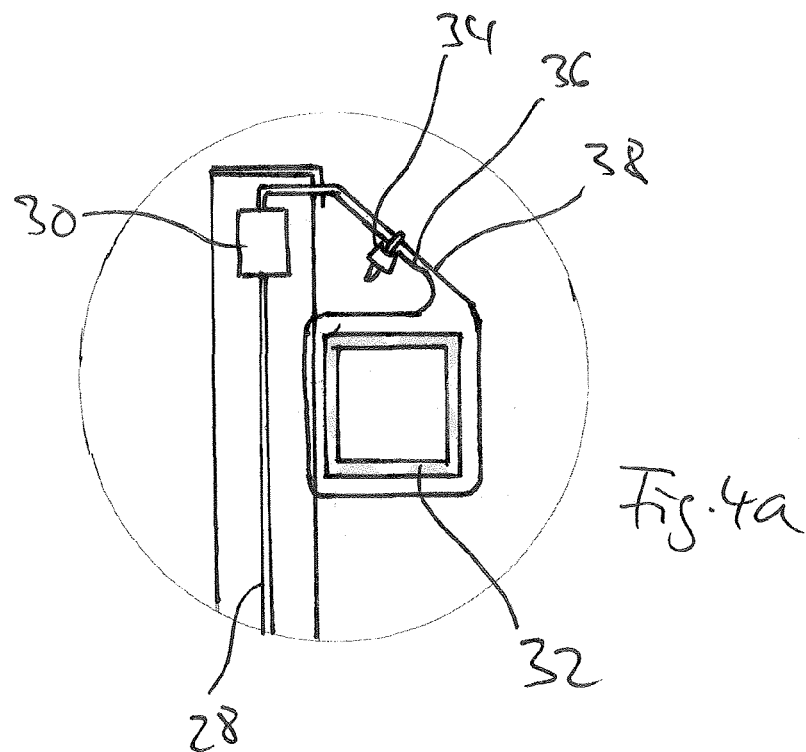
Fig. 4a
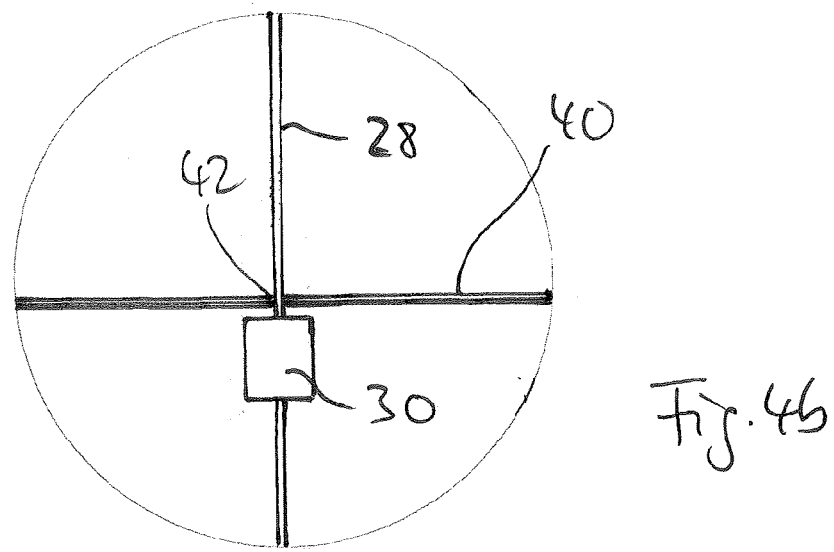
Fig. 4b
Fig. 4

MACHINE HOUSING WITH ROPE STOP SAFETY

FIELD OF THE INVENTION

The present invention relates to a machine housing of a machine tool or an automated machine such as an automated storage system having protective walls covering sides of the machine housing.

The invention also relates to an upgrade kit for a housing of a machine tool or an automated machine such as an automated storage system having protective walls covering the sides of the machine housing.

BACKGROUND OF THE INVENTION

In machine housings of a machine tool or of other automated machines such as automated machines in a production line or of automated storage systems, the sides of the machine housing are usually covered by protective side walls.

These side walls on the one hand are provided for protecting the inside of the respective machine from dust or dirt and on the other hand to protect humans from a potential injury by getting into contact with dangerous components such as toxic chemicals, high voltage power lines or mechanical objects which could cut off human body parts.

Machine housings of a machine tool or an automated machine such as an automated storage system are therefore known wherein the lateral sides of the housing are covered by a plurality of wall segments arranged on top of each other and are removably attached to the lateral sides of the housing by clipping or hanging the wall segments into fixture devices attached to the sides of the housing. The lateral sides are considered to be for example the front side, back side, right or left side of a machine housing irrespective of the point of view.

The wall segments are usually mounted to the sides of the housing in a removable way in order to facilitate repair and maintenance of the machines.

Nevertheless, in areas endangered by earthquake, the problem arises that the wall segments are loosened from the fixture devices by the shock and vibration of the earthquake. Those loosened wall segments then fall to the ground and may cause an injury of humans being in the vicinity of the machine.

SUMMARY OF THE INVENTION

It is therefore an object of the present invention to provide a machine housing of a machine tool or an automated machine such as an automated storage system with enhanced security.

This object is solved by a machine housing of a machine tool or an automated machine such as an automated storage system having protective side walls covering the lateral sides of the machine housing, wherein each lateral side wall comprises at least one or a plurality of wall segments, arranged on top of each other, wherein a rope stop safety is provided, wherein each wall segment is secured to the machine housing via said rope stop safety and wherein said rope stop safety comprises at least one cable.

Providing such a rope stop safety has the advantage of securing the wall segments against falling down in the event of an earthquake when the wall segments are loosened from the fixture devices by the shock and vibration of the earthquake.

It is another object of the present invention to provide an upgrade kit for a housing of a machine tool or an automated machine such as an automated storage system having protective walls covering the sides of the machine housing.

This object is solved by an upgrade kit for a housing of a machine tool or an automated machine such as an automated storage system having protective walls covering the sides of the machine housing, wherein each lateral side wall comprises at least one or a plurality of wall segments, arranged on top of each other, the upgrade kit comprising a rope stop safety for securing each wall segment to the machine housing via said rope stop safety, wherein said rope stop safety comprises at least one cable and at least one cable fastener.

Providing such an upgrade kit has the advantage of retrofitting existing machine housings such that the existing wall segments can be secured against falling down in the event of an earthquake when the wall segments are loosened from the fixture devices by the shock and vibration of the earthquake.

BRIEF DESCRIPTION OF THE DRAWINGS

The invention will now be disclosed in more detail with reference to the appended drawings described below.

FIG. 3 includes FIGS. 3A, 3B and 3C, respectively showing three detailed views labeled I to III as depicted in FIG. 1;

FIG. 4 includes FIGS. 4A and 4B, respectively is showing two detailed views IV and V as depicted in FIG. 2;

FIG. 5B shows a side view of that shown in FIG. 5A; FIG. 6B shows a side view of that shown in FIG. 6A.

DETAILED DESCRIPTION

Figure 1:
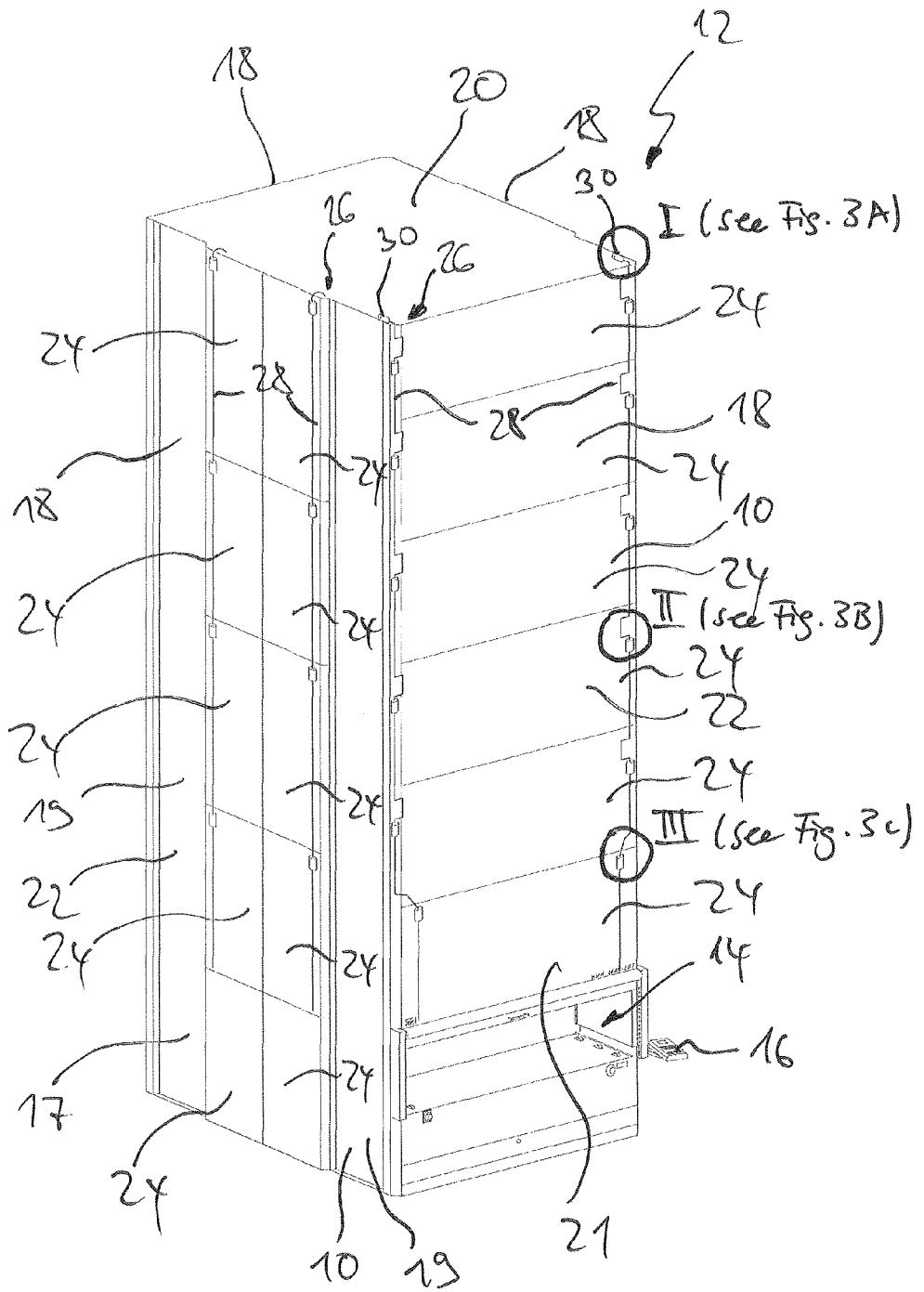
FIG. 1 is showing an isometric view of a front side of a machine housing of an automated storage system.

FIG. 1 shows an isometric view of a front side of a machine housing 10 of an automated storage system 12 for storing files, items or the like. The automated storage system 12 comprises a loading port 14 for loading files or items to be stored and an operational control 16 for controlling the functions of the automated storage system 12. The automated storage system 12 works for example as a storage lift system.

The machine housing 10 has four lateral sides 18 and a top 20. The lateral sides 18 are covered by protective side walls 22, each side wall 22 comprising a plurality of wall segments 24 arranged on top of each other.

The top 20 of the machine housing 10 is mounted to a top roof structure.

The wall segments 24 are mounted to the lateral sides 18 by clipping or hanging the wall segments 24 into fixture devices attached to the sides 18 of the housing 10 in a removable way in order to facilitate repair and maintenance of the automated storage system 12. In order to secure the wall segments 24 against falling down, the machine housing 10 comprises a rope stop safety 26, having steel cables 28.

In one embodiment, the steel cables 28 are mounted to the top roof structure via steel cable fasteners in the form of clamping rings 30 (see FIG. 3).

In another embodiment, the steel cables 28 are mounted to a cross-beam 32 of the machine housing 10 (see FIG. 4), wherein the steel cables 28 are mounted to the cross-beam 32 by entangling the cross-beam 32. Therefore, a rope clamp 34 is provided clamping parts 38, 38 of the steel cables 28 entangling the cross-beam 32.

The wall segments 24 covering the lateral sides 18 have a wall segment profile 40 (see FIGS. 3C and 4B) on the side facing the lateral sides 18 of the machine housing 10, the profile 40 having two holes 42 arranged mirror-invertedly on the sides of the profile 40, each steel cable 28 passing through a respective hole 42 and mounted to the respective wall segment 24 by a steel cable fastener in the form of a clamping ring 30. The clamping rings 30 (see also FIGS. 3 and 4) are fixedly connected to the steel cable 28 and have a bigger diameter than the respective holes 42. Thus, the clamping rings 30 inhibit the steel cable 28 from sliding through the holes 42 of the wall segment profile 40. Therefore, the wall segments 24 cannot fall to the ground. On the left side 17 and on the right side (no reference numeral) permanently fixed parts 19 are attached to the machine housing 10, wherein the detachable wall segments 24 are secured by one steel cable 28 per wall segment. On the front side 21 and back side 23, each wall segment 24b is secured by two steel cables 28.

By securing the wall segments 24 via the rope stop safeties 26 having the steel cables 28, the wall segments 24 cannot fall to the ground when being loosened from the fixture devices by the shock and vibration of an earthquake and therefore injuries of humans being in the vicinity of the automated storage system 12 can be prevented.

Figure 2:
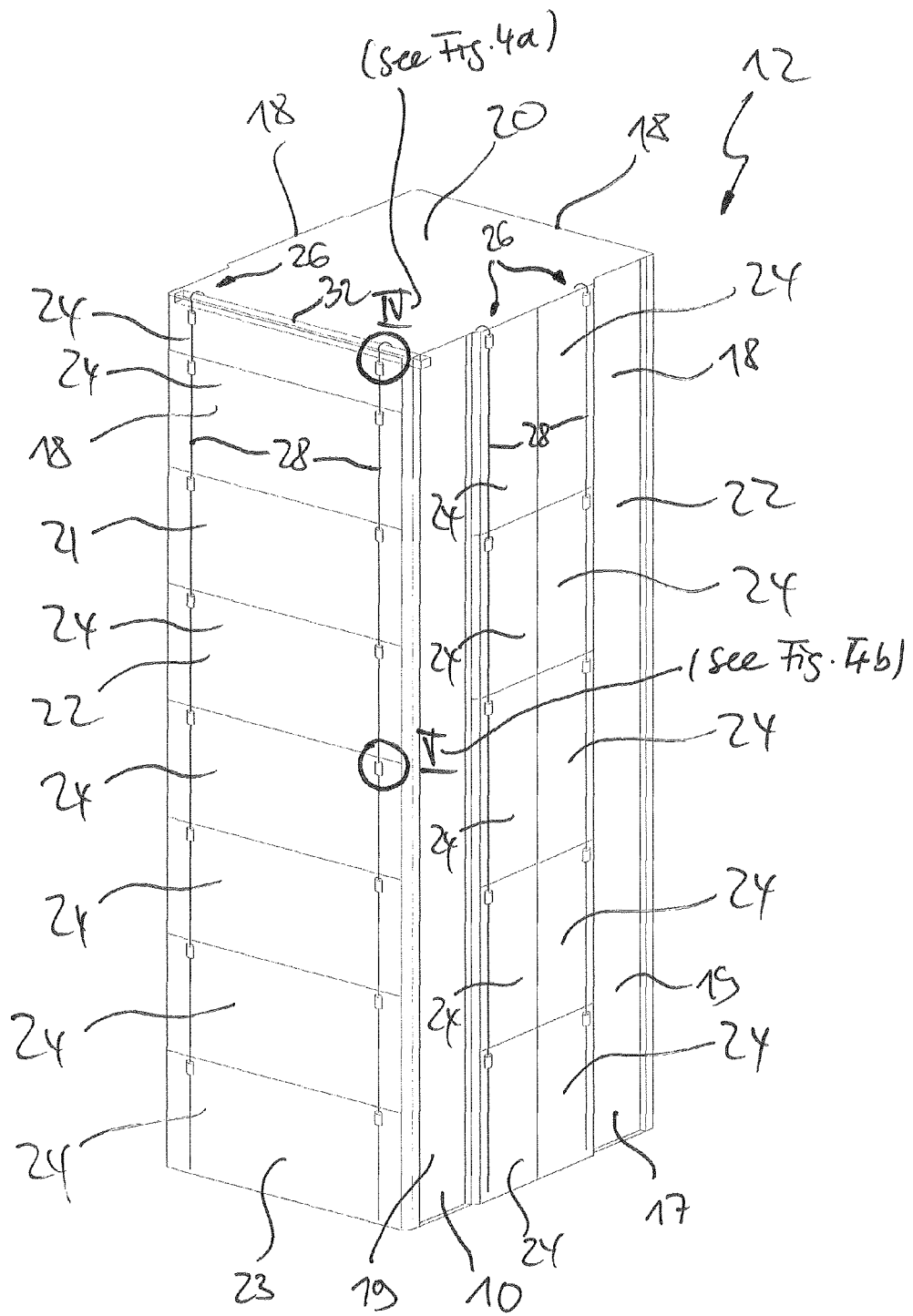
FIG. 2 is showing an isometric view of a back side of a machine housing of the automated storage system of FIG. 1.

FIG. 2 shows an isometric view of a back side of the machine housing 10 of the automated storage system 12. Like elements are denoted having like reference numerals.

Figure 5:
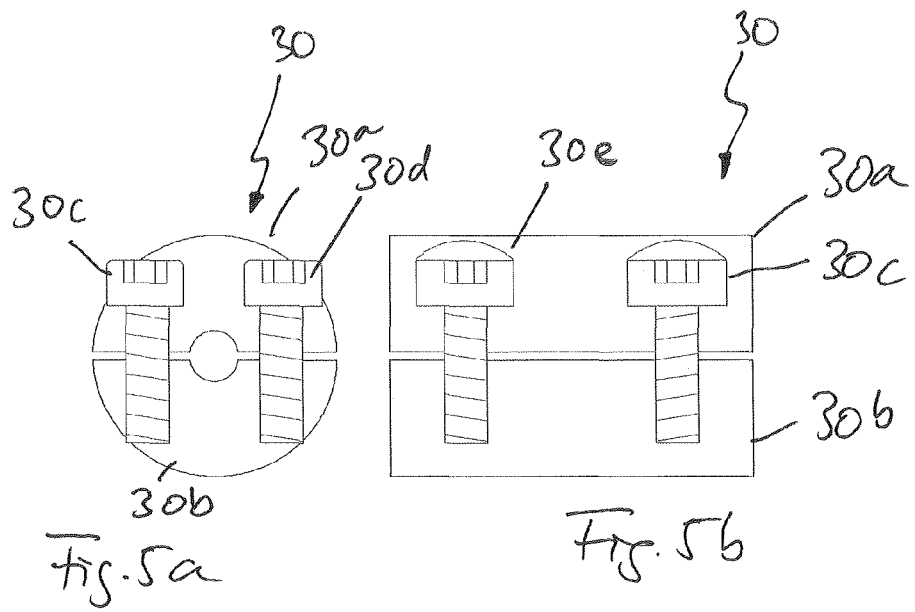
FIG. 5 includes FIGS. 5A and 5B showing a clamping ring steel cable fastener, where

In FIG. 3, three detailed views labeled I to III as depicted in FIG. 1 are shown in FIGS. 3A to 3C. FIG. 3A shows in detail how the steel cable 28 is mounted to the top roof structure via a steel cable fastener in the form of the clamping ring 30. The clamping ring 30 is shown in further detail in FIG. 5, and includes two members 30a, 30b being coupled together by fasteners 30c, 30d, 30e. FIG. 3B shows in detail that the steel cable 28 is arranged in the machine housing 10 in a meandering manner. Arranging the steel cable 28 in a meandering manner provides for additional length of the steel cable 28. FIG. 3C shows in detail how the steel cable 28 passes through the hole 42 in the wall segment profile 40 on the side of the wall segment 24 facing the lateral sides 18 of the machine housing 10, and how the steel cable 28 is secured to the wall segment 24 via the clamping ring 30 shown in FIG. 5.

Figure 6:
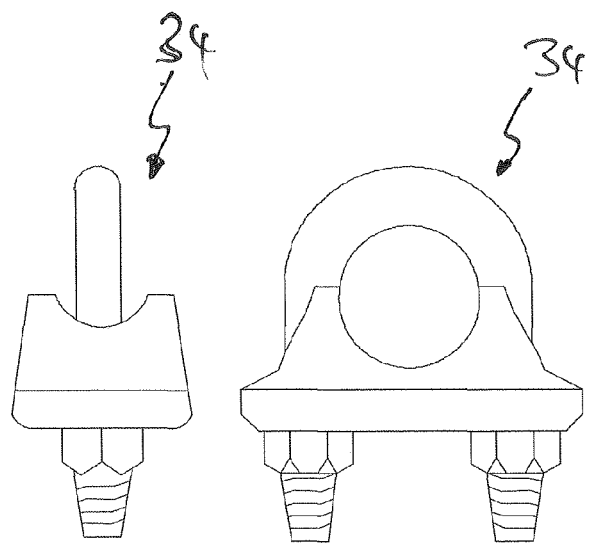
FIG. 6 includes FIGS. 6A and 6B showing a rope clamp steal cable fastener, where

In FIG. 4, two detailed views labeled IV to V as depicted in FIG. 2 are shown in FIGS. 4A and 4B. FIG. 4A shows in detail how the steel cable 28 is mounted to the cross-beam 32 by entangling the cross-beam 32. Therefore, the rope clamp 34 is provided clamping the parts 38, 38 of the steel cables 28 entangling the cross-beam 32. The rope clamp 34 is shown in further detail in FIG. 6. FIG. 4B shows in detail how the steel cable 28 passes through the hole 42 in the wall segment profile 40 on the side of the wall segment 24 facing the lateral sides 18 of the machine housing 10, and how the steel cable 28 is secured to the wall segment 24 via a clamping ring 30 shown in FIG. 5.

In still another embodiment not shown in the drawings, not all wall segments 24 are secured to the machine housing 10 directly via use of the same steel cable 28. According to this embodiment only some wall segments 24 are directly secured to the machine housing 10 via a steel cable 28, wherein the rope stop safety 26 comprises securing other wall segments 24 indirectly to the machine housing 10 by securing them in the known way described above with a steel cable 28 to another wall segment 24 which is indirectly secured to the machine housing 10. Therefore, wall segments 24 which are secured to the machine housing 10 directly are connectedly secured to wall segments 24 by use of additional steel cables 28, clamping rings 30 and rope clamps 34.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A machine housing of a machine tool or an automated machine, including an automated storage system having protective side walls covering lateral sides of the machine housing, wherein each protective side wall comprises at least one or a plurality of wall segments, arranged on top of each other, wherein a rope stop safety is provided, wherein each wall segment is secured to the machine housing via said rope stop safety and wherein said rope stop safety comprises at least one cable.

2. The machine housing of claim 1, wherein the cable is a steel cable.

3. The machine housing of claim 1, wherein the machine housing comprises a top roof structure, wherein the cable is mounted to said top roof structure via at least one cable fastener.

4. The machine housing of claim 1, wherein the machine housing comprises an internal cross-beam mounted to the top of the machine housing, wherein the at least one cable is mounted to said cross-beam via at least one cable fastener.

5. The machine housing of claim 1 wherein the machine housing comprises an internal cross-beam mounted to the top of the machine housing, wherein the at least one cable is mounted to said cross-beam via at least one cable fastener, wherein the cable fastener is a rope clamp and wherein the cable is mounted to the cross-beam by entangling the cross-beam, the rope clamp clamping parts of the cable entangling the cross-beam.

6. The machine housing of claim 1, wherein the at least one cable is disposed in the interior of the machine housing between the lateral sides of the housing and the wall segments.

7. The machine housing of claim 1, wherein the at least one cable is arranged in the machine housing in a meandering manner.

8. The machine housing of claim 1, wherein the rope stop safety comprises two steel cables and at least four steel cable fasteners.

9. The machine housing of claim 1, wherein the wall segments comprise a wall segment profile on the side facing the lateral sides of the machine housing having at least one hole, the cable passing through said hole and being mounted to the respective wall segment by a cable fastener arranged below said hole.

10. The machine housing of claim 1, wherein the rope stop safety comprises two cables and at least two cable fasteners, and wherein the wall segments comprise a wall segment profile on the side facing the lateral sides of the machine housing, the profile having two holes arranged mirror-inverted on the sides of the profile, each cable passing through a respective hole and being mounted to the wall segment by a cable fastener arranged below said hole.

11. The machine housing of claim 1, wherein the wall segments comprise a wall segment profile on the side facing the lateral sides of the machine housing, the profile having at least one hole, the cable passing through said hole and being mounted to the respective wall segment by a cable fastener arranged below said hole and wherein the diameter of the cable fastener is bigger than the diameter of the hole.

12. The machine housing of claim 1, wherein the wall segments comprise a wall segment profile on the side facing the lateral sides of the machine housing, the profile having at least one hole, the cable passing through said hole and being mounted to the respective wall segment by a cable fastener below said hole, wherein the diameter of the cable fastener is bigger than the diameter of the hole and wherein said cable fastener is a clamping ring.

13. The machine housing of claim 1, wherein the machine housing comprises a top roof structure, wherein the cable is mounted to said top roof structure via at least one cable fastener, wherein the wall segments comprise a wall segment profile on the side facing the lateral sides of the machine housing, the profile having at least one hole, the cable passing through said hole and being mounted to the respective wall segment by a cable fastener arranged below said hole, wherein the diameter of the cable fastener is bigger than the diameter of the hole and wherein said cable fastener is a clamping ring.

14. The machine housing of claim 1, wherein the machine housing comprises an internal cross-beam mounted to the top of the machine housing, wherein the at least one cable is mounted to said cross-beam via at least one cable fastener, wherein the wall segments comprise a wall segment profile on the side facing the lateral sides of the machine housing, the profile having at least one hole, the cable passing through said hole and being mounted to the respective wall segment by a cable fastener arranged below said hole, wherein the diameter of the cable fastener is bigger than the diameter of the hole and wherein said cable fastener is a clamping ring.

15. The machine housing of claim 1, wherein the machine housing comprises a top roof structure, wherein the rope stop safety comprises two cables and at least four cable fasteners, wherein the cables are mounted to said top roof structure via a respective cable fastener, wherein the wall segments comprise a wall segment profile on the side facing the lateral sides of the machine housing, the profile having two holes arranged mirror-inverted on the sides of the profile, each cable passing through a respective hole and being mounted to the wall segment by a cable fastener arranged below said hole, wherein the diameter of the cable fastener is bigger than the diameter of the hole and wherein said cable fasteners arranged below the holes are clamping rings.

16. The machine housing of claim 1, wherein the machine housing comprises an internal cross-beam mounted to the top of the machine housing, wherein the rope stop safety comprises two cables and at least four cable fasteners, wherein the each cable is mounted to said cross-beam via at least one cable fastener, and wherein the wall segments comprise a wall segment profile on the side facing the lateral sides of the machine housing, the profile having two holes arranged mirror-inverted on the sides of the profile, each cable passing through a respective hole and being mounted to the wall segment by a cable fastener arranged below said hole, wherein the diameter of the cable fastener is bigger than the diameter of the hole and wherein said cable fasteners arranged below the holes are clamping rings.

17. An upgrade kit for a housing of a machine tool or an automated machine, including an automated storage system having protective walls covering the sides of the machine housing, wherein each protective wall comprises at least one or a plurality of wall segments, arranged on top of each other, the upgrade kit comprising a rope stop safety for securing each wall segment to the machine housing via said rope stop safety, wherein said rope stop safety comprises at least one steel cable and at least one steel cable fastener.

* * * * *